May 10, 1966  K. A. HONROTH  3,250,581

BEARING ASSEMBLY AND METHOD OF MAKING

Filed Nov. 8, 1963  2 Sheets-Sheet 1

*INVENTOR.*
KENNETH A. HONROTH
BY

ATTORNEYS

May 10, 1966 K. A. HONROTH 3,250,581

BEARING ASSEMBLY AND METHOD OF MAKING

Filed Nov. 8, 1963 2 Sheets-Sheet 2

INVENTOR.
KENNETH A. HONROTH
BY
ATTORNEYS

United States Patent Office 3,250,581
Patented May 10, 1966

3,250,581
BEARING ASSEMBLY AND METHOD OF MAKING
Kenneth A. Honroth, Cleveland Heights, Ohio, assignor to Kendale Washer and Stamping Company, a corporation of Ohio
Filed Nov. 8, 1963, Ser. No. 322,433
10 Claims. (Cl. 308—191)

My invention relates to bearing structures and to the method of fabricating the same.

An object of my invention is to provide an improved structure for a bearing until particularly utilized for conveyor rollers.

Another object is the provision of an improved construction of a bearing unit wherein ball bearings are held in position between an inner race member and an outer race member.

Another object is the provision of an economical structural arrangement for securing an outer race member in position in a bearing unit.

Another object is the provision for fabricating and assembling a bearing unit without weakening the structure and without disturbing the equilibrium of the structure.

Another object is the provision of a bearing unit obviating the disadvantages and defects of prior bearing devices of the general class.

Another object is the provision of an improved method for economical and convenient assembly of bearing devices of this general class.

Another object is the provision of economical means for constructing such bearing devices.

Other objects and a fuller understanding of the invention may be had by referring to the following description and claims, taken in conjunction with the accompanying drawings, in which:

Figure 1:
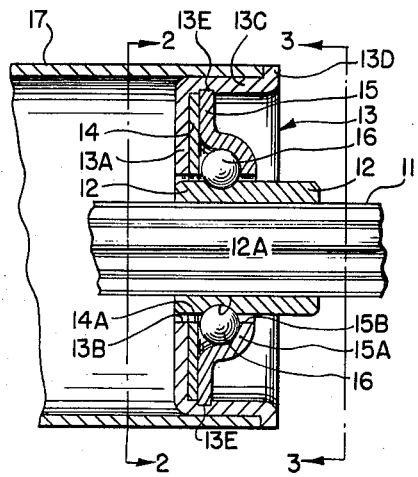
FIGURE 1 is a longitudinal sectional view taken axially through a preferred form of my improved bearing device.

A customary use of bearing devices of this general class is for providing bearing supports to the opposite ends of conveyor rollers, as for example, conveyor rollers as illustrated in United States Patent 2,768,725. The present invention is an improvement over the bearing devices shown and illustrated in said Patent 2,768,725, and in the method therein disclosed.

My improved bearing device includes an inner race member 12 which may be internally splined to complementarily accommodate and engage with a splined shaft 11 extending axially through the inner race member. The inner race member 12 has an annular groove 12A extending therearound which accommodates a circle of ten ball bearings 16 arranged therein in the usual manner.

There is provided a cup-shaped shell member 13 which engages in the ends of a cylindrical conveyor roller 17, as illustrated. This cup-shaped shell member 13 has a bottom wall 13A disposed normal to the axis of the bearing device. A central opening 13B accommodates the inner race member 12. Extending in an axial direction from the outer periphery of the bottom wall 13A is a cylindrical side wall 13C which, in turn, terminates at its outer or free end in a flange or bead portion 13D extending radially outwardly from the side wall 13C. The flange or bead portion 13D overlays and abuts the end of the roller 17. There is a driven interfit between the side wall 13C and the inner wall of the roller 17 whereby the engagement between the shell member 13 and the roller 17 is such that they are firmly held together so as to revolve as a unit after assembly of the bearing device in the roller 17.

Positioned adjacent the bottom wall 13A inwardly of the shell member 13 is a flat disc member 14 having a central opening 14A therein for accommodating the inner race member 12. Next adjacent to the disc member 14 and within the bore of the shell member 13 is another disc member 15. The disc member 15 has a cupped portion 15A formed to accommodate the balls 16 between the cupped portion 15A and the disc member 14. The disc member 15 has a central opening 15B for accommodating the inner race member 12. The inner wall surface of the cupped portion 15A complements the contour of the balls 16, as illustrated.

The disc members 14 and 15 are of a relatively hard metal and preferably a tempered or hardened steel, which disc members together form a good serviceable and wear-resistant raceway for the balls 16. The shell member 13 is of a relatively softer and more malleable metal than are the disc members 14 and 15 and preferably is made of a mild or relatively soft steel. The outer peripheral edge of the disc member 15 is embedded or coined within the wall 13C by compression or radially directed strain of the shell member 13 against the disc member 15. By reason of the difference in the hardness of the materials, the outer edge portion of the disc member 15 forms a coined groove 13E in the wall 13C. In the drawing, the depth of the coined groove 13E is shown somewhat exaggerated as in practice it is only sufficient to firmly bind the disc member 15 in position within the shell member 13 and firmly against the disc member 14 which, in turn, abuts the bottom wall 13A. This interlocks the disc member 15 with the shell member 13 which, in turn, firmly holds the disc member 14 in position and thus secures the outer race member, made up of discs 14 and 15, in position to properly hold the balls 16 in position for revolving around in the raceway thus provided.

Figure 2:
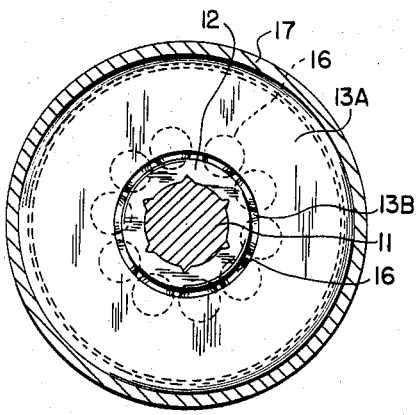
FIGURE 2 is a cross-sectional view looking in the direction of the arrows 2—2 of FIGURE 2.
Figure 3:
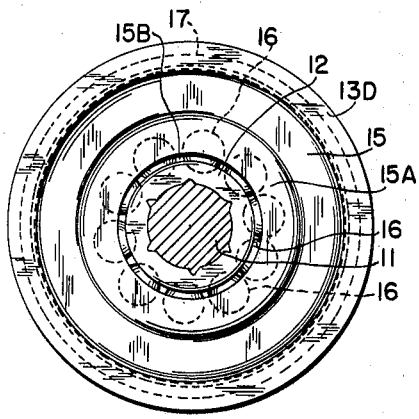
FIGURE 3 is an end view looking in the direction of the arrows 3—3 of FIGURE 1.
Figure 4:
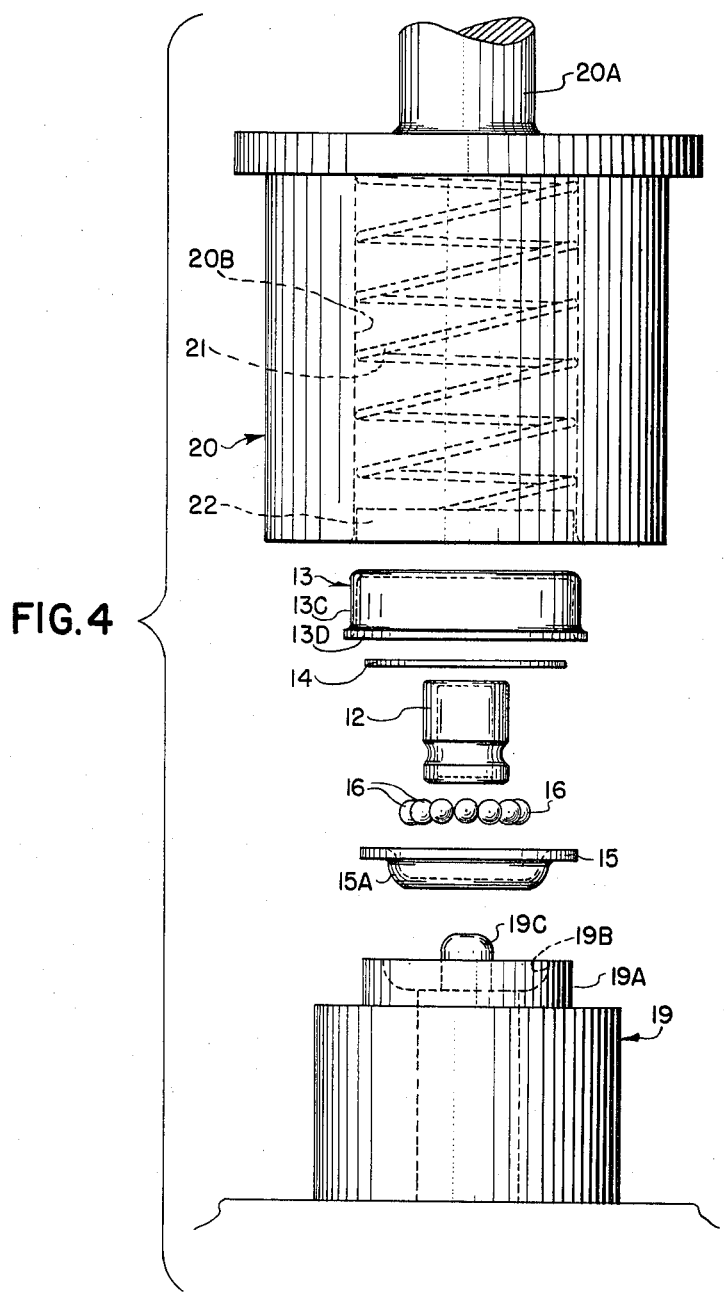
FIGURE 4 is an exploded view of my improved bearing device in axial arrangement between the upper and lower dies of the assembly apparatus used in the method of assembling my bearing device.

The method of assembling and fabricating the bearing device illustrated in FIGURES 1, 2 and 3 is best shown in FIGURE 4. Prior to assembly, the outside diameter and the inside diameter of the wall 13C of the shell member 13 are slightly larger than in the completed assembled condition shown in FIGURES 1, 2 and 3. As stated, the shell member 13 shown in FIGURE 4 is of relatively soft metal, such as mild steel, whereas the disc members 14 and 15 are of relatively hard metal, such as hardened steel. When the shell member 13 is in its enlarged and non-compressed condition, the disc members 14 and 15 are of such diameter as to readily move into and slide along axially within the bore of the shell member 13. For assembly, the parts of the bearing device are in the relative position shown in FIGURE 4 although not necessarily of that spacing therebetween, which is illustrated in FIGURE 4 for purposes of showing the order of the parts being assembled.

Supported on a suitable base is a closing nest or lower die 19 which has an upwardly projecting portion 19A in which there is a recess 19B for accommodating and complementarily receiving the cupped portion 15A of the disc member 15. Extending axially upwardly from the lower die 19 is the center post 19C adapted to receive and accommodate in axial alignment the disc member 15, inner race member 12, and disc member 14. The disc member 15 is placed over the projecting portion 19A with the cupped portion 15A engaging the wall of the recess 19B. Balls 16 are inserted in proper position and the inner race member 12 is positioned within the circle of balls 16 and over the post 19C. The disc member 14 is then placed adjacent the disc member 15 and over the balls 16. The shell member 13 is then placed downwardly upon, and in axial alignment with, the assembly of disc member 15, circle of balls 16, inner race member 12 and disc member 14.

There is provided a sizing punch or upper die 20 which has an axially extending bore 20B which extends upwardly from the open bottom thereof. The bore 20B is of a slightly smaller diameter than the outside diameter of the wall 13C of shell member 13 before its compression. There is a small radius or lead at the entrance to the bore 20B to facilitate the entry of the shell member 13 into the bore. A disc-like steel plate 22 is positioned in the bore 20B so as to be slidably movable axially thereof. A coil spring 21 within the bore 20B abuts at one end the plate 22 and at the other end abuts a ram-connected portion 20A of the upper die 20. The bias of the spring 21 is such as to resiliently urge the plate 22 downwardly away from the supporting portion 20A. By the ram of a suitable machine connected to portion 20A pressing the upper die 20 downwardly to force the shell member, abutted against lower die 19, to within the bore 20B, the plate 22 rises against the spring 21 and the shell member 13 is forced within the bore 20B. The spring-biased plate 22 aids in maintaining the shell member 13 in proper axial alignment rather than being cocked or tilted.

The disc members 14 and 15 together with the balls 16 and inner race member 12 are within the shell member 13 at the time that the wall 13C of the shell member 13 is contracted radially inward by reason of the smaller diameter of the bore 20B. During this movement of the parts, the disc members 14 and 15 are up against the bottom wall 13A of the shell member 13, that is, in the position shown in FIGURE 1. Prior to compression of the outer wall 13C, there is a sliding fit of the disc members 14 and 15 within the shell member 13 so that they are moved by the force between the dies 19 and 20 to the position adjacent the bottom wall 13A as illustrated in FIGURE 1. The relative outer dimensions of the disc member 15 and of the bore of the wall 13C is such that upon the radial compression and shrinkage of the wall 13C by the die member 20, the outer edge of the disc member 15 coins itself into the inner surface of the wall 13C a slight amount but sufficient to firmly hold the disc member 15 in locked position within the shell member 13. After the parts are interlocked to hold the disc members firmly in position within the shell member so as to secure the balls in position within the outer raceway and around the inner race member 12, then the upper die 20 is raised and the spring 21 forces the assembly of parts outwardly of the die 20. The assembled die device is then removed from the apparatus made up of die members 19 and 20. This improved bearing device may then be mounted in the opposite ends of a tubular roller 17 so as to provide bearing support therefor, such as is illustrated in FIGURE 1. It is to be noted that the terminal flange or bead portion 13D is thus available for abutting against the end of the roller 17 and is not required for holding the disc member 15 in position.

It is also to be noted that this construction and method herein described and illustrated obviates the need for shave-staking of the inner surface of the cylindrical wall 13C, as for example, in the manner illustrated in the above-mentioned U.S. Patent 2,768,725. It is to be noted also that such shave-staking as shown and described in that patent weakens the cylindrical wall of the bearing unit comparable to the cylindrical wall 13C here shown. Also such shave-staking disturbs the uniformity of the mass of the shell member 13 around its circumference and thus disturbs the equilibrium of the bearing device which is so important in the operation of such bearing devices. My improved bearing device is also more economical in requiring a more facile and faster operation assembly and better lends itself to production methods. Both the finished bearing device and the method of making the same have advantages over the disclosures of the known prior art.

The present disclosure includes that contained in the appended claims, as well as that of the foregoing description.

Although this invention has been described in its preferred form and preferred practice with a certain degree of particularity, it is understood that the present disclosure of the preferred form and practice has been made only by way of example and that numerous changes in the details of construction and the combination and arrangement of parts and steps may be resorted to without departing from the spirit and scope of the invention as hereinafter claimed.

What is claimed is:

1. A bearing unit comprising in combination, a cup-shaped shell member having an apertured bottom wall, a cylindrical wall extending from said bottom wall, and an outwardly-turned bead at the outer end of said cylindrical wall, an inner race member disposed concentrically of said shell member, said inner race member having an annular groove formed on the outer wall thereof, a plurality of ball bearings arranged in said groove concentric with said inner race member, a first apertured disc member disposed in said shell member next adjacent said bottom wall and in axial alignment therewith, a second apertured disc member disposed in said shell member next adjacent said first apertured disc member and in axial alignment therewith, the second disc member having a greater diameter than the outside diameter of said first disc member, the said disc members adjacent their outer peripheral edges being disposed in parallel planes normal to the axis of said shell member, the apertures in said disc members being in axial alignment, said first and second disc members being spaced apart around the inner peripheral edges thereof around the aligned apertures therein radially outward of the said inner race member in the plane of said groove to provide an outer raceway for said ball bearings, the outer peripheral edge of said second disc member being tightly embraced by the said cylindrical wall of the shell member radially outwardly of the second disc member to embed the said outer peripheral edge of the second disc member in said shell member thereby to firmly hold the second disc member within the shell member and to retain the first disc member intermediate the second disc member and said bottom wall, the second disc member adjoining said outer peripheral edge thereof being disposed adjacent, and in a plane parallel to, said first disc member and gradually extending therefrom toward said inner peripheral edge of the second disc member, the said cylindrical wall of the shell member having a symmetrically uniform thickness around the circumferential extent thereof from said second disc member to said bead.

2. A bearing unit comprising a cup-shaped shell member having a cylindrical wall extending in an axial direction from a bottom wall thereof, a pair of disc members positioned in said shell member in axial alignment with said bottom wall, said disc members having aligned central round openings and being spaced apart adjacent said central round openings to provide an annular raceway, an inner race member concentrically mounted in said aligned openings, and a plurality of ball bearings arranged in a circle in said annular raceway and around said inner race member, the outer peripheral edge portions of said disc members being in parallel planes normal to the axis of said shell member and being disposed adjacent to each other, the outer peripheral edge portion of one of said disc members being disposed between the outer peripheral edge portion of the other of said disc members and the bottom wall of said shell member, the outer peripheral edge portion of said other disc member extending radially outward toward the cylindrical wall of said shell member more than the outer peripheral edge portion of said other disc member, and the outer peripheral edge portion of said other disc member around the circumference thereof being under mutually opposed radially directed pressure, said cylindrical wall being coinable metal, said radially directed pressure by coining action embedding the outer peripheral edge portion of the said other disc member in said cylindrical wall to lock the disc members in said shell member.

3. In a bearing unit having an inner race member, an outer race member, and a plurality of ball bearings arranged in a circle between said race members and in bearing engagement therewith, the improvement of a pair of disc members having aligned central openings therethrough for accommodating the inner race member and having the inner peripheral edge portion of one disc member spaced axially from the inner peripheral edge portion of the other disc member to provide a raceway in said outer race member for said ball bearings, and a cup-shaped shell member having a bottom wall and a cylindrical wall extending therefrom in an axial direction, said wall being symmetrical in thickness around the circumference thereof, a first of said disc members being positioned adjacent said bottom wall and the second of said disc members being positioned against the first disc member to hold the same against said bottom wall, said second disc member extending radially inward and in an axial direction from said first disc member to define with said first disc member a raceway for said balls around the aligned central openings in said disc members, said shell member having a flange directed radially outward therefrom at an axial distance from said second disc member, said flange being adapted to engage a tubular roller in which the bearing unit is mountable, the peripheral edge portion of said second disc member defining an outer cylindrical surface concentric with the axis of the shell member, the diameter of said outer cylindrical surface of the second disc member being greater than the inner diameter of said cylindrical wall of the shell member adjacent to the second disc member on the side thereof toward said flange, the said cylindrical wall being in a state of compressive strain around the outer peripheral edge of said second disc member exerting a force radially inwardly directed thereon to tightly embrace and slightly embed said second disc member around the circumference thereof, whereby the disc members are locked in position in the shell member and the said cylindrical wall extends in symmetrically uniform thickness from said second disc member to said flange.

4. In a bearing unit having inner race member, outer race member and a plurality of ball bearings disposed in a circle between and in bearing engagement with said race members, the improvement of a pair of aligned and adjacent apertured disc members having their apertures in axial alignment and being disposed concentric with said inner race member, at least one of said disc members being dished around the aperture therein to provide a raceway for said balls between said disc members around the apertures therein, said disc members composing said outer race member, a cup-shaped shell member having a cylindrical wall of coinable metal and an apertured flat bottom wall disposed normal to the axis of said inner race member and having the aperture therein aligned with the apertures in said disc members, and disposed concentric with the said inner race member, the outer edge portion of one of said disc members being disposed adjacent said flat bottom wall and the outer edge portion of the other of said disc members being disposed adjacent and on the other side of the one said disc member, the outer edge portions of said disc members and said flat bottom wall of the shell member being disposed in parallel planes, the outer edge portion of said one disc member having a maximum diameter substantially equal to the diameter of said flat bottom wall of the shell member internally of the cylindrical wall thereof, the outer edge portion of said other disc member having a maximum diameter greater than the maximum diameter of said one disc member, the said cylindrical wall of the shell member and the outer peripheral edge portion of the said other disc member being under tight radially directed strain in engagement with each other, the said cylindrical wall being coined thereby around the circumferential extent of the said other disc member to interlock the said other disc member against axial movement away from said flat bottom wall and from the said one disc member, said shell member holding said disc members in position against axial displacement relative to each other.

5. The improvement as claimed in claim 4 and in which the said cylindrical wall has an outwardly directed flange at its free end away from said flat bottom wall for forming an abutment with the end of a tubular roller in which the bearing unit is mounted, and in which the said cylindrical wall intermediate said other disc member and said flange is uniformly thick around the circumference thereof to provide symmetry in mass therearound.

6. A bearing unit comprising the combination of an inner race member, a plurality of ball bearings arranged in a circle around said inner race member in bearing engagement therewith, a pair of relatively hard steel disc members having aligned central openings and disposed adjacent to each other concentric with said inner race member, said disc members being abutted against each other around the outer peripheral edge portions thereof and being spaced from each other in an axial direction around the inner peripheral edge portions thereof to provide an inner raceway accommodating said ball bearings, and a cup-shaped shell member of relatively soft steel having a bottom wall and a cylindrical side wall extending forwardly therefrom and embracing said disc members, one of said disc members being abutted against said bottom wall to anchor said one disc member against rearward axial movement, the other of said disc members having its outer peripheral edge pressed into the said cylindrical wall by radially directed opposed pressure between said cylindrical wall and said outer peripheral edge of the said other disc member around the circumference thereof, said opposed pressure being sufficient to coin said cylindrical wall and to interlock therewith, the said disc members adjacent the outer peripheral edges thereof being in parallel planes normal to the axis of the shell member, the outer peripheral edge of said other disc member having a maximum diameter greater than the maximum diameter of the peripheral edge of said one disc member to protrude radially outward of said one disc member into said cylindrical side wall of said cup member, the interlocking of the said other disc member and said cylindrical wall holding said disc members in abutment with each other and the said one disc member in abutment with said bottom wall against axial movement therebetween.

7. The method of making a bearing unit comprising the steps of providing an inner race member, a plurality of ball bearings arranged in a circle, a first disc member, a second disc member having a greater diameter than that of the first disc member, and a cupped shell member having a bottom wall and a cylindrical side wall, said disc members having aligned central openings, the disc members being of a relatively hard metal and said shell member being of a relatively soft metal, arranging said inner race member, circle of balls, disc members and shell member in axial alignment and in a sequence to position the circle of balls around the inner race member and between the disc members adjacent aligned openings to provide an outer raceway for said balls between said disc members, disposing the disc members adjacent the outer peripheral edges thereof in parallel planes and in engagement with each other, said other disc member protruding radially outward beyond the one disc member, nesting the disc members and ball bearings in said shell member to position one disc member against the said bottom wall and to position the other disc member against the one disc member to hold it against said bottom wall, and radially inwardly compressing the said cylindrical wall about the outer peripheral edge of said other disc member to tightly engage and compress said other disc member, the harder metal of said other disc member coining the softer metal of said shell member to interlock therewith, the said disc members being held in position in said shell member by said interlock of the shell member and said other disc member.

8. In the manufacture of a bearing unit, the method of locking an outer race structure of the bearing unit to a cup-shaped shell member having a cylindrical outer wall adapted to be mounted in the end of a conveyor roller, said shell member being of relatively soft metal and said outer race structure having an outer peripheral edge portion of relatively hard metal, said outer peripheral edge portion being disposed in a flat plane normal to the axis of the outer race member and having an outer diameter less than the inner diameter of said shell member prior to the application of the hereinafter described radial inward pressure thereon to permit the outer race structure to be nested in said shell member, comprising the nesting of said outer race structure within said shell member to press it rearwardly against the rear of the shell member, and applying radial inward force on said shell member around the circumferential extent of the said outer race structure to embed the same into the shell member and thereby lock the said outer race structure against movement forwardly out of said shell member, said radial inward force being applied along the extent of said outer wall thereof sufficiently to retain said outer wall in cylindrical form.

9. In the manufacture of bearing devices having an inner race member, a plurality of ball bearings arranged in a circle about the inner race member, an outer race member disposed about said circle of balls to provide a raceway therefor, and a shell member carrying the inner and outer race members and ball bearings and adapted to fit in the hollow end of a tubular conveyor roller, the improvement of providing for the said outer race member a pair of apertured disc members axially aligned and disposed adjacent to each other around the outer radial portions thereof and axially spaced from each other around the aligned apertures therein to provide an outer raceway for said ball bearings, providing for said shell member a cup-shaped member having a bottom wall, one of said disc members having a smaller outer diameter than the other disc member, said other disc member extending in a flat plane beyond the peripheral extent of said one disc member, a cylindrical side wall extending therefrom, and an outwardly extending bead portion at the free end thereof, the bore of said shell member defined by said side wall having an initial inner diameter greater than the outer diameters of said disc members to permit the disc members to slide axially therein to a position wherein said one disc member on one side abuts said bottom wall and the said other disc member abuts said one disc member on the other side thereof to hold the said one disc member against the said bottom wall, positioning said inner race member, said ball bearings and said disc members within said cup-shaped member with said ball bearings arranged around said inner race member and in said outer raceway provided by said disc members, with said one disc member abutting said bottom wall and the said other disc member abutting said one disc member to hold it against said bottom wall, and radially inwardly compressing said cylindrical side wall against the outer peripheral edge of said other disc member to permanently decrease the inner diameter of said cylindrical side wall and thus tightly embrace said other disc member and hold the same against axial movement away from said one disc member.

10. The improvement claimed in claim 9 and wherein said cup-shaped member is of relatively soft distortable metal and said other disc member is of relatively hard non-distortable metal whereby the outer edge portion of said other disc metal coins a groove in said cylindrical side wall to interlock therewith upon the radially inward compression of said cylindrical side wall against said other disc member.

References Cited by the Examiner
UNITED STATES PATENTS

| | | | |
|---|---|---|---|
| 2,693,026 | 11/1954 | Simpelaar | 29—516 |
| 2,768,725 | 10/1956 | Foulds et al. | 308—20 |
| 2,923,391 | 2/1960 | Hewitt | 308—20 |
| 3,062,026 | 11/1962 | Pitner | 29—148.4 |

DAVID J. WILLIAMOWSKY, *Primary Examiner.*

FRANK SUSKO, DON A. WAITE, *Examiners.*